F. M. BALDWIN.
AUTO SIGNAL DISPLAY.
APPLICATION FILED JAN. 2, 1919.
1,326,127.
Patented Dec. 23, 1919.
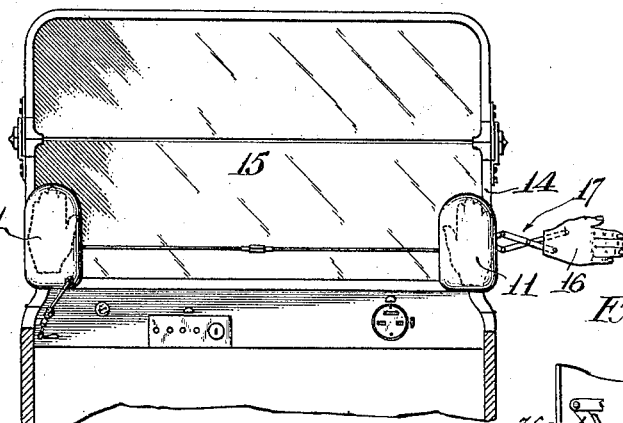
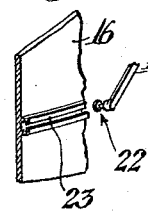
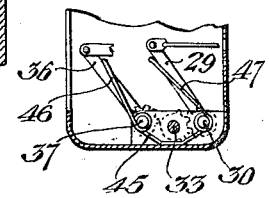
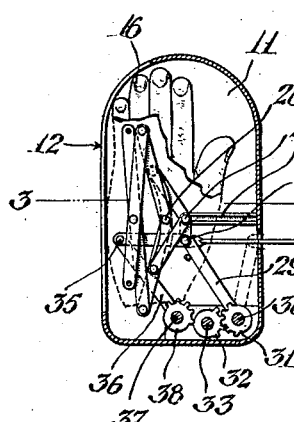
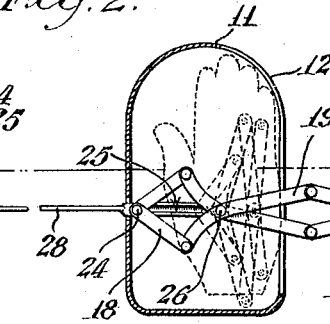
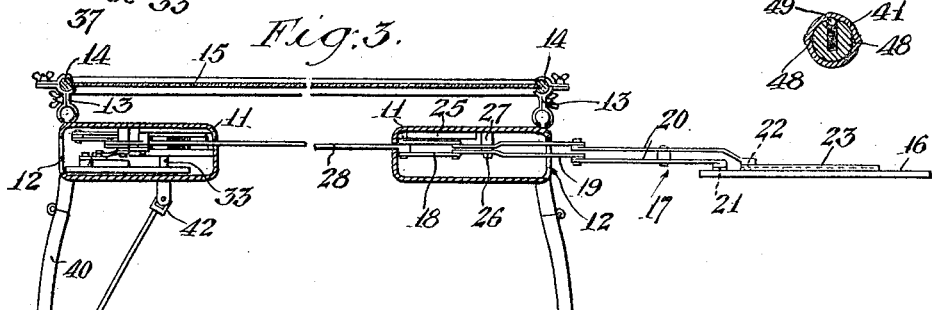
Inventor
Frederick M. Baldwin
by Graham Harris
Attorneys

UNITED STATES PATENT OFFICE.

FREDERICK M. BALDWIN, OF LOS ANGELES, CALIFORNIA.

AUTO SIGNAL DISPLAY.

1,326,127.   Specification of Letters Patent.   Patented Dec. 23, 1919.

Application filed January 2, 1919. Serial No. 269,382.

*To all whom it may concern:*

Be it known that I, FREDERICK M. BALDWIN, a citizen of the United States, residing at Los Angeles, in the county of Los Angeles and State of California, have invented a new and useful Auto Signal Display, of which the following is a specification.

My invention relates to a signal display for automobiles, being more particularly a signal to indicate the direction of travel of the automobile displaying the signal. It is a common practice for the driver of an automobile to extend his hand from the side of the automobile to indicate to the traffic the fact that he is about to turn to the right or left, but in so doing it is necessary to remove his hand from the steering wheel at a time when both hands are needed on the wheel.

The principal object of my invention is to produce an auto signal display of the character described, of simple form and construction, which may be readily attached to an automobile.

Other objects and advantages will appear hereinafter from the following description.

Referring to the drawings, which are for illustrative purposes only,

Figure 1 is a face view of a wind shield and part of an automobile showing a signaling device embodying my invention mounted on the wind shield frame.

Fig. 2 is an enlarged view partly in section of the signaling device shown in Fig. 1.

Fig. 3 is a sectional plan view on line 3—3 Fig. 2, and

Fig. 4 is an enlarged perspective view partly in section of part of one of the displays.

Fig. 5 is a fragmentary sectional view of a portion of the operating mechanism showing elastic retaining means, and Fig. 6 is a cross-sectional view of the operating bar support.

The signal consists of two hollow boxes 11 each having an opening 12 in one side thereof through which the display may freely move as hereinafter described. These boxes 11 may be attached in any suitable manner to the wind shield or other part of the automobile, one on each side. In the form shown each box 11 is provided with a clamp 13 which engages the frame 14 of the wind shield 15.

The displays preferably consist of sheet metal plates 16 in the outline of a hand and are mounted on the outer ends of lazy tongs 17. The lazy tongs consist of inner links 18, intermediate links 19 and outer links 20. Each hand 16 is pivotally mounted at 21 to the outer end of one of the outer links 20, the outer end of the other link 20 being provided with a headed pin 22 which freely slides in a cam track 23 formed on one side of the hand. This manner of attaching the hand to the lazy tongs causes the hand to swing downwardly and outwardly during the extension of the lazy tongs, that is, from the dotted line position to the full line position as illustrated by the right hand box 11 in Fig. 2. The inner end of the lazy tongs, that is, the links 18 are pivotally connected at their inner ends by means of a pin 24 which extends into a track 25 formed on the inner face of the box 11, which track supports the inner end of the lazy tongs and also guides the direction of movement of the lazy tongs. The lazy tongs in each box are pivotally mounted in their respective boxes by means of pins 26 mounted in studs 27 on the boxes, such pins also serving as means to pivotally connect the intermediate links 19 together. The lazy tongs in the right hand box are also connected by the pin 24 to a rod 28 which extends through the walls of the boxes 11 and is connected by means of an arm 29 to a shaft 30 mounted in the left hand box and which is provided with a toothed segment 31 which meshes with a toothed segment 32 on an operating shaft 33. The lazy tongs in the left hand box are connected by their pin 24 with a stud 34 which is connected by a link 35 with an arm 36 which is fixed to a shaft 37 provided with a toothed segment 38 which meshes with the segment 32.

The shaft 33 is operated by means of a handle 39 which may be placed on any available portion of the automobile, in the present instance I have shown the handle 39 mounted on the door 40 by means of a bracket 41, the shaft 33 being provided with universal joints 42 to accommodate the swinging movement of the door.

The device when mounted operates as in Fig. 1, the signal display, that is, the hand being shown extended from the right hand side of the machine as an indication that the machine is about to turn to the right. It is to be noted that this hand when so extended is in approximately the same position as the hand of a person would be extended from the side of a machine, that is, being mounted upon the lazy tongs the hand is extended well beyond the line of the machine and is easily visible from both the front and back of the machine.

To extend the hand as shown in Fig. 1 the handle 39 has been moved from a vertical position into the position shown in Figs. 1 and 3. This movement of the hand has operated the shaft 33 and through the medium of the segment 32 meshing with the segment 31 has operated the shaft 30 to throw the arm 29 from the dotted line position in Fig. 2 to the full line position thereby extending the lazy tongs in the right hand box into the full line position shown thereby indicating that the vehicle is about to turn to the right. By returning the handle 39 to an upright position the lazy tongs are collapsed through the medium of the mechanism just described and the hand assumes the dotted line position in the box.

If it is desired to display the hand at the left of the machine the handle 39 is moved to the left and the shaft 33, through the medium of the segment 32 meshing with the segment 38, the arm 36 is operated to move the stud 34 through the link connection 35, the stud moving inwardly and thereby extending the lazy tongs. When it is desired to conceal the signal display the return movement of the handle 39 to its intermediate position collapses the lazy tongs and withdraws the hand into the box.

45 designates a spring which is coiled intermediate its length about shafts 30 and 37, one end 46 of the spring engaging the arm 36 and the other end 47 of the spring engaging the arm 29 so as to put an elastic tension on the respective lazy tongs for the purpose of elastically holding the lazy tongs in closed position thereby preventing a jarring of the signal display when the same is within the box.

For the purpose of retaining the operating handle 39 in either extreme position or intermediate position the bracket 41 is provided with recesses 48 arranged to be engaged by a spring detent 49 carried on the shaft 33 as shown in Fig. 6.

What I claim as my invention is:

1. An auto signal display comprising a box mounted on each side of the automobile, a signal display in each box arranged in vertical position therein, a lazy tongs in each box, means for pivotally connecting one of the outer links of the lazy tongs to the display, means for slidably connecting the other outer link to the display, and means for operating said lazy tongs whereby said display is swung from vertical to horizontal position during the extension of the lazy tongs.

2. An auto signal display comprising a signal box mounted on each side of the automobile, a lazy tongs mounted in each box, a display in each box arranged in vertical position therein connected to its associated lazy tongs in such a manner as to cause the display to move into horizontal position upon extension of the lazy tongs, an operating shaft, and means connecting said operating shaft to the respective lazy tongs whereby the said displays may be extended beyond their respective boxes one at a time and handle means connected to said operating shaft.

3. An auto signal display comprising a signal box, a lazy tongs mounted in said signal box, a display connected to the outer links of said lazy tongs, one of said links being pivotally connected to said display and the other of said links being slidably connected to said display, and means for operating said lazy tongs to extend the lazy tongs to move said display outwardly from said box, said display constituting the outline of a hand.

4. An auto signal display comprising a signal box, consisting of inner, outer and intermediate links, a lazy tongs mounted in said signal box, a display connected to the outer links of said lazy tongs, one of said links being pivotally connected to said outer display and the other of said outer links being slidably connected to said display, means for pivotally mounting the intermediate links to a fixed member on said box, means connected to the inner links for operating said lazy tongs to extend the lazy tongs to move said display outwardly from said box, said display constituting the outline of a hand, and means for elastically retaining the lazy tongs in closed position.

In testimony whereof, I have hereunto set my hand at Los Angeles, California, this 24th day of December, 1918.

FREDERICK M. BALDWIN.